US010520036B2

(12) United States Patent
Ishida et al.

(10) Patent No.: US 10,520,036 B2
(45) Date of Patent: Dec. 31, 2019

(54) SEALING DEVICE (71) Applicant: UCHIYAMA MANUFACTURING CORP., Okayama (JP)

(72) Inventors: Koki Ishida, Okayama (JP); Wakana Kato, Okayama (JP)

(73) Assignee: UCHIYAMA MANUFACTURING CORP., Okayama (JP)

( * ) Notice: Subject to any disclaimer, the term of this patent is extended or adjusted under 35 U.S.C. 154(b) by 0 days.

(21) Appl. No.: 16/149,583

(22) Filed: Oct. 2, 2018

(65) Prior Publication Data
US 2019/0107154 A1  Apr. 11, 2019

(30) Foreign Application Priority Data

Oct. 6, 2017  (JP) ................................. 2017-196152

(51) Int. Cl.
*F16C 33/78*  (2006.01)
(52) U.S. Cl.
CPC ............................... *F16C 33/7823* (2013.01)
(58) Field of Classification Search
CPC .............. F16C 33/7823; F16C 33/7883; F16C 33/7886
See application file for complete search history.

(56) References Cited

U.S. PATENT DOCUMENTS

| | | | | |
|---|---|---|---|---|
| 3,685,838 A * | 8/1972 | Malmstrom | ........... | F16J 15/162 277/402 |
| 3,955,859 A * | 5/1976 | Stella | ................... | F16J 15/3232 384/215 |
| 4,667,968 A * | 5/1987 | Nash | ..................... | F16J 15/3284 277/552 |
| 4,799,808 A * | 1/1989 | Otto | ........................ | B61F 15/22 277/349 |
| 4,844,480 A * | 7/1989 | Gralka | ................... | F16J 15/164 277/552 |
| 5,167,419 A * | 12/1992 | Robertson | .............. | F16J 15/164 277/552 |
| 6,206,380 B1 * | 3/2001 | Miyazaki | .............. | F16C 19/184 277/551 |

(Continued)

FOREIGN PATENT DOCUMENTS

| | | |
|---|---|---|
| DE | 102015212156 A1 | 1/2017 |
| JP | 2010230058 A | 10/2010 |

(Continued)

*Primary Examiner* — Thomas R Hannon
(74) *Attorney, Agent, or Firm* — Rankin, Hill & Clark LLP (57) ABSTRACT

A sealing device for sealing an annular space constituted by an inside member and an outside member which rotate relatively to each other includes a core metal having a cylindrical portion fitted to one of the inside member and the outside member, and a seal lip member fixed to the core metal and having a plurality of lip portions contacting the other of the inside member and the outside member. The lip portions includes a first lip portion provided at a position closest to the outside and blocking ventilation between the outside and a space existing between the lip portions, and another lip portion provided at a position farther from the outside than the first lip portion. The other lip portion is provided with a through-hole, which is open to front and rear surfaces and allow ventilation, at a position apart from a contact portion with the other member.

5 Claims, 6 Drawing Sheets

(56) References Cited

U.S. PATENT DOCUMENTS

6,609,716 B2 * 8/2003 Friend .................... F16J 15/164
                                                             277/550
9,897,147 B2 * 2/2018 Cognolato .......... F16C 33/7823

FOREIGN PATENT DOCUMENTS

| JP | 2015218742 A | 12/2015 |
| JP | 2017110786 A | 6/2017 |

* cited by examiner

SEALING DEVICE

BACKGROUND

1. Technical Field

The embodiments disclosed herein relate to a sealing device for sealing an annular space provided with an inside member and an outside member which rotate relatively to each other, and more particularly, to a sealing device provided with a plurality of lip portions and mounted between an outside member and an inner member.

2. Description of the Related Art

In the sealing device as described above, when the outside member or the inside member rotates, the internal pressure of the annular space changes under the influence of the use environment or the like, and the lip portion is sticked to the contacting member (contact surface) and then sucked. In addition, as the outside member or the inside member rotates, the space existing between the plurality of lip portions rises in temperature and expands, and when the rotation of the outside member or the inside member is stopped and the temperature decreases, the space becomes a negative pressure and the lip portion is adsorbed to the contact surface. As described above, when the rotation is resumed in a state in which the lip portion is adsorbed to the contact surface, there is a problem that will become one of the causes of the increase in rotational torque.

JP-A-2010-230058, JP-A-2015-218742, and JP-A-2017-110786 disclose the structure for solving the above-described problem. JP-A-2010-230058 discloses a sealing device in which a communication hole communicating a sealed side and an external side is provided in an axial lip which slides on an axial end face of an inner shaft. In addition, JP-A-2015-218742 discloses a sealing device in which a through-hole is provided in an intermediate portion of an outer side seal lip, such that the space surrounded by the seal lip, the inner side seal lip, and the slinger communicates with the outside. Furthermore, JP-A-2017-110786 discloses a sealing device in which a notch penetrating in the thickness direction is provided in a lip positioned on an annular space side, and a valve extending in a tongue shape toward a lip tip is formed.

SUMMARY

By the way, in the case of the sealing device disclosed in JP-A-2010-230058, since the communication hole is formed in the axial lip of the radially outermost side (outer side), there is a fear that foreign matter (muddy water or the like) intrudes from the outside through the communication hole. The foreign matter ingressing into the sealing device bites in the sliding contact portion between the inner axial lip and the inner shaft, which causes the wear of the axial lip. In addition, even in the case of the sealing device disclosed in JP-A-2015-218742, since the through-hole is formed in the outer seal lip, foreign matter easily intrudes, and thus there is a fear that foreign matter may get caught between the inner seal lip and the slinger and similar trouble may occur. Furthermore, in the case of the sealing device disclosed in JP-A-2017-110786, although the tongue-shaped valve adjusts the internal pressure between the lips, it is assumed that it is difficult to precisely design and manufacture the valve so as to perform a desired operation.

The embodiments have been made in view of the above circumstances and provide a sealing device capable of effectively reducing rotational torque.

A sealing device for sealing an annular space constituted by an inside member and an outside member which rotate relatively to each other includes: a core metal having a cylindrical portion fitted to one of the inside member and the outside member; and a seal lip member fixed to the core metal and having a plurality of lip portions contacting the other of the inside member and the outside member, wherein the plurality of lip portions includes a first lip portion provided at a position closest to the outside and blocking ventilation between the outside and a space existing between the lip portions, and another lip portion provided at a position farther from the outside than the first lip portion, and the other lip portion is provided with a through-hole, which is open to front and rear surfaces to allow ventilation, at a position apart from a contact portion with the other member.

When the inside member and the outside member rotate relatively to each other, frictional energy is generated between the lip portion and the other member, and air existing between the plurality of lip portions tends to expand. However, according to the sealing device of the present invention, the air is discharged to the outside of the space between the lip portions through the through-hole. In addition, when the relative rotation of the inside member and the outside member is stopped, the temperature decreases and, as the air is discharged, the pressure between the lip portions tends to become a negative pressure. However, in this case, since the air flows between the lip portions through the through-hole, the negative pressure is eliminated. Therefore, it is possible to alleviate the change in internal pressure occurring between the lip portions and reduce the rotational resistance during the relative rotation of the inside member and the outside member.

Furthermore, since the through-hole is not formed in the first lip portion provided at a position closest to the outside and is formed to block ventilation with the outside, it is possible to prevent foreign matter such as muddy water from intruding into the other lip portion.

As compared with a structure in which the valve is formed in the lip portion, it is possible to easily realize the lip portion having the function of alleviating the change in the internal pressure between the lip portions.

In the sealing device of the present invention, grease having a consistency of 350 or less may be supplied to the other lip portion so as to cover at least one of openings on the front side or the rear side of the through-hole.

According to this, when the relative rotation of the inside member and the outside member is stopped, the grease becomes a semi-solid state and functions to close the through-hole. Therefore, it is possible to prevent muddy water or the like from intruding through the through-hole by the grease. On the other hand, when the grease receives a shear force due to the negative pressure between the lip portions and the relative rotation of the inside member and the outside member, the grease becomes liquefied and easily flows, and thus air between the lip portions smoothly flows through the through-hole. Therefore, it is possible to improve the sealing performance without deteriorating the function of alleviating the internal pressure change between the lip portions. In addition, when the consistency of the grease exceeds 350, it becomes impossible to expect the function of closing the through-hole provided in the other lip portion by the grease as described above.

In the sealing device of the present invention, the through-hole may be formed to have a size to allow gas to pass hindering the grease from passing.

It is known that the resistance force of the fluid such as the grease to pass through the through-hole is inversely proportional to the diameter of the through-hole. According to this, together with the yield stress of the grease, as the through-hole becomes smaller, the grease has a large force required for passing as compared with the gas, and it is possible to prevent the grease from moving to other spaces through the through-hole.

In the sealing device of the present invention, the other lip portion includes a second lip portion provided at a position which is closest to the annular space, and a third lip portion provided at a position which is second closest to the annular space, and the through-hole may be provided in each of the second lip portion and the third lip portion.

According to this, when the internal pressure change between the lip portions occurs, the annular space having a volume larger than that between the lip portions can be used as a buffer, and thus it is possible to further improve the effect of alleviating the internal pressure change.

In the sealing device of the present invention, the through-hole may be provided so as to be separated from the other member by 0.1 mm or more in a state in which the lip portion where the through-hole is provided comes into contact with the other member.

According to this, even if the plurality of lip portions come into relatively sliding contact with each other in a state of elastically deforming the other member, the opening of the through-hole is not blocked by the other member, and thus it is possible to prevent the function of the through-hole from being impaired. Incidentally, when the separation distance of the through-hole from the other member is less than 0.1 mm, the opening of the through-hole is likely to be blocked by the other member due to the elastic deformation of the lip portion.

According to the sealing devices of the present invention, it is possible to effectively reduce the rotational torque.

BRIEF DESCRIPTION OF THE DRAWINGS

FIGS. 2A and 2B are views illustrating a first embodiment of a sealing device according to the present invention, wherein FIG. 2A is an enlarged view of a portion X in FIG. 1 and FIG. 2B is an enlarged view of a portion Z in FIG. 2A;

DESCRIPTION OF THE EMBODIMENTS

Figure 1:
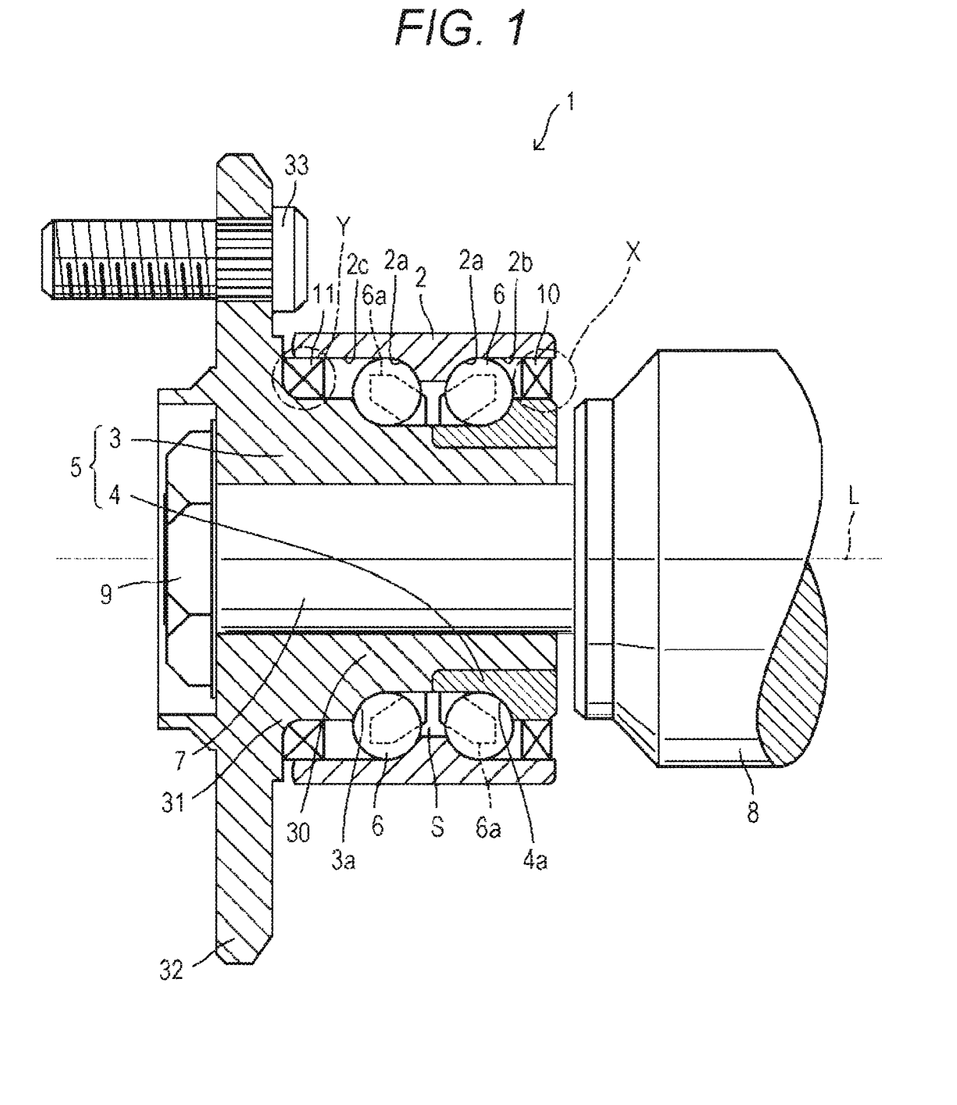
FIG. 1 is a schematic longitudinal sectional view illustrating an example of a bearing device to which a sealing device according to the present invention is applied.

Hereinafter, embodiments of the present invention will be described with reference to the drawings. FIG. 1 illustrates a bearing device 1 which axially rotatably supports a wheel (not illustrated) of an automobile. The bearing device 1 roughly includes an outer ring 2 as an outside member, a hub wheel 3, an inner ring member 4 fitted integrally with the body side of the hub wheel 3, and two rows of rolling elements (balls) 6 interposed between the outer ring 2, and the hub wheel 3 and the inner ring member 4. In this example, the hub wheel 3 and the inner ring member 4 constitute an inner ring 5 as an inside member. The outer ring 2 is fixed to the vehicle body (not illustrated) of the automobile. In addition, a drive shaft 7 is coaxially spline-fitted to the hub wheel 3, and the drive shaft 7 is connected to a drive source (drive transmission portion) (not illustrated) through a constant velocity joint 8. The drive shaft 7 is integrated with the hub wheel 3 by a nut 9, and the removal of the hub wheel 3 from the drive shaft 7 is prevented. The inner ring 5 (the hub wheel 3 and the inner ring member 4) is rotatable around the axis L with respect to the outer ring 2. The outer ring 2 and the inner ring 5 constitute two members which rotate relatively to each other. An annular bearing space (annular space) S is formed between the two members. In the bearing space S, two rows of the rolling elements 6 are interposed in a state of being held by a retainer 6a, such that a bearing ring 2a of the outer ring 2 and bearing rings 3a and 4a of the hub wheel 3 and the inner ring member 4 are rollable. The hub wheel 3 has a cylindrical hub wheel body 30 and a hub flange 32 formed so as to extend radially outwardly from the hub wheel body 30 through a rising base portion 31, wheels are attached and fixed to the hub flange 32 with bolts 33 and nuts (not illustrated). Hereinafter, the side facing the wheel in the direction of the axis L (the side facing the left side in FIG. 1) is referred to as the wheel side, and the side facing the vehicle body (the side facing the right side) is referred to as the vehicle body side.

Bearing seals 10 and 11 are mounted at both end portions of the bearing space S in the direction of the axis L between the outer ring 2 and the inner ring member 4 and between the outer ring 2 and the hub wheel 3, and both end portions of the bearing space S in the direction of the axis L are sealed. The bearing seals 10 and 11 prevent muddy water or the like from intruding into the bearing space S or prevent lubricant (grease or the like) filled in the bearing space S from leaking to the outside. The sealing device according to the present invention is applied to the bearing seals 10 and 11.

Figure 2A:
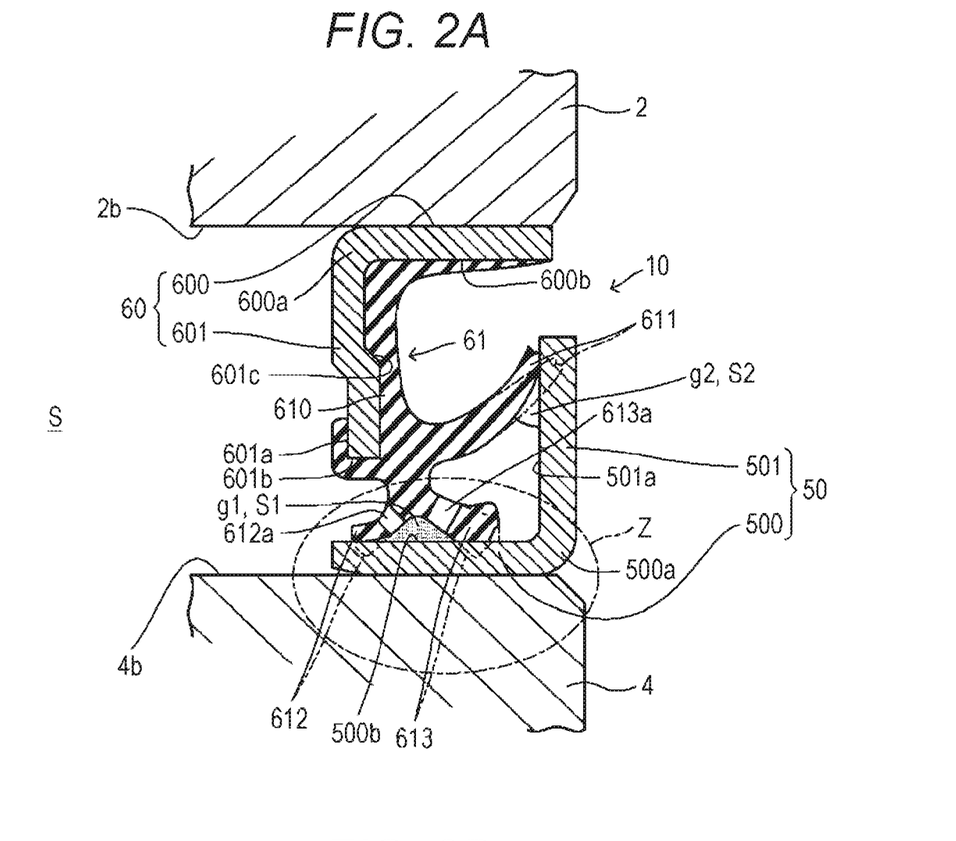
Figure 2B:
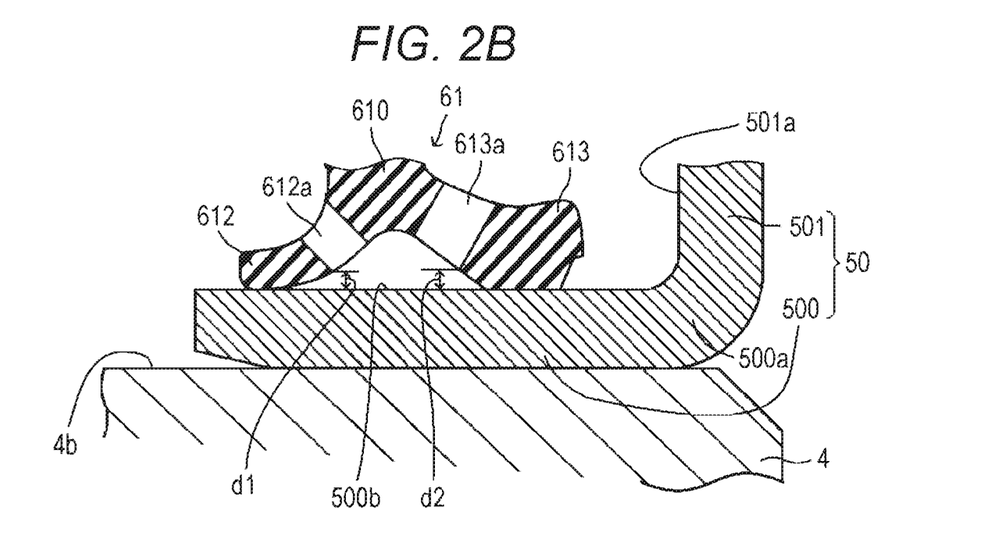
Figure 3A:
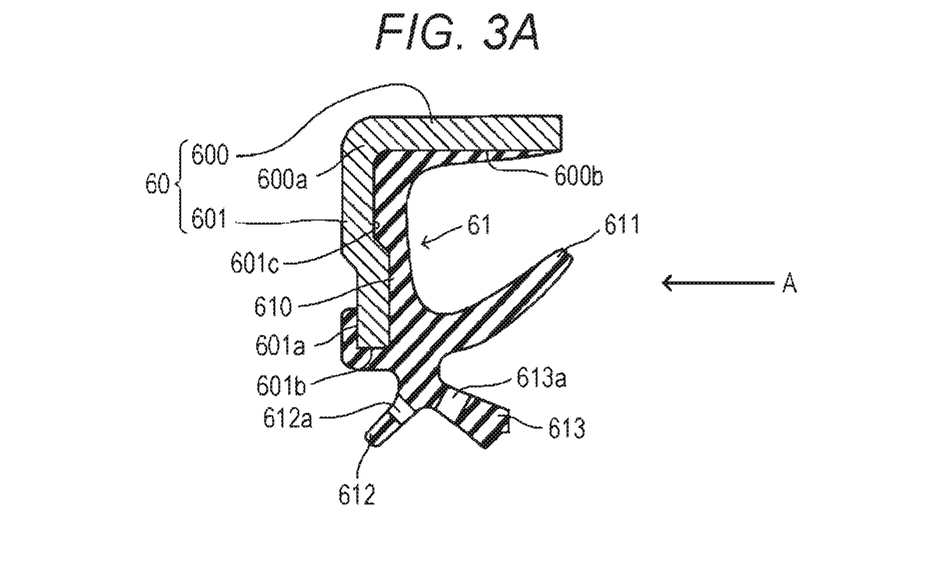
FIG. 3A is a schematic cross-sectional view for explaining a shape of a seal lip member fixed to a core metal of the sealing device.
Figure 3B:
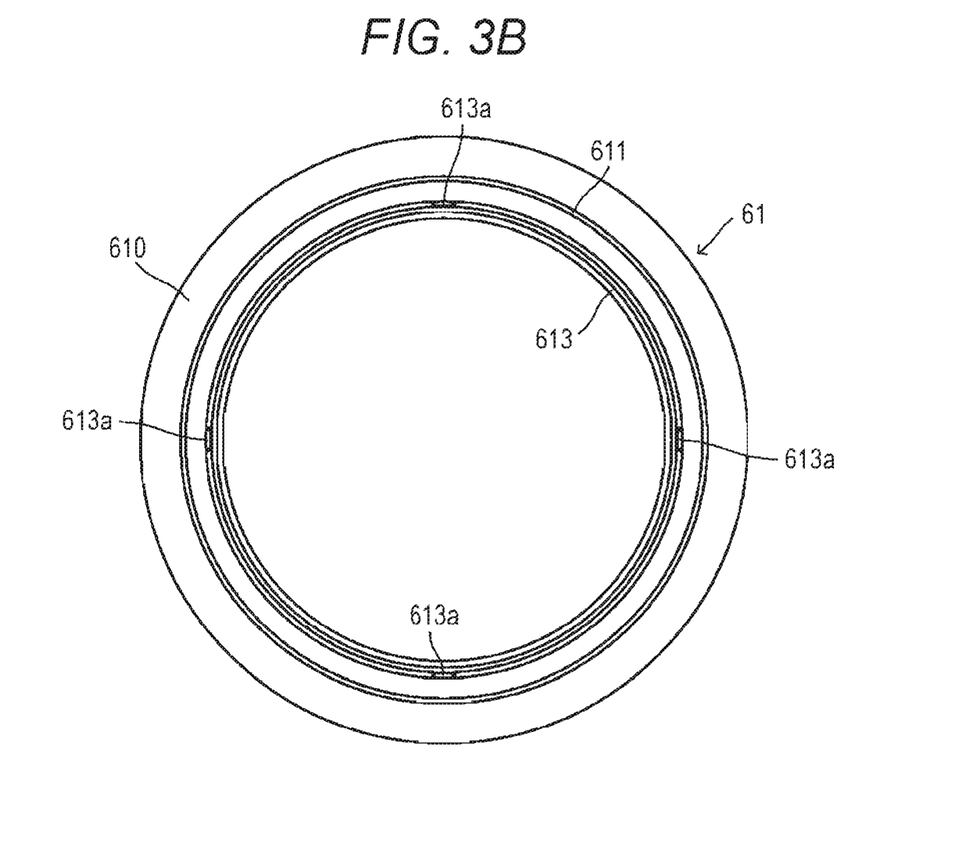
FIG. 3B is a view for explaining the seal lip member provided in the sealing device and is an entire view of only the seal lip member when viewed in a direction of an arrow A in FIG. 3A.

The bearing seal (sealing device) 10 which is the first embodiment of the sealing device according to the present invention will be described with reference to FIGS. 2 and 3. The bearing seal 10 includes a core metal 60 attached to the vehicle body side end portion of the bearing space S and having a cylindrical portion 600 fitted to an outer ring (outside member, one member) 2, and a seal lip member 61 fixed to the core metal 60 and having a plurality of lip portions contacting the slinger (inside member, the other member) 50. The plurality of lip portions include a first lip portion 611 provided at a position closest to the outside and blocking ventilation between the outside and the lip portion, and second and third lip portions (the other lip portions) 612 and 613 provided at positions farther from the outside than the first lip portion 611. In the second and third lip portions 612 and 613, through-holes 612a and 613a having a circular shape when viewed from the front are provided at positions spaced apart from contact points with the slinger (inside member, the other member) 50. The through-holes 612a and 613a are open to the front and rear surfaces to allow ventilation. In the present embodiment, the second lip portion 612 is provided at a position which is closest to the bearing space S, and the third lip portion 613 is provided at a position which is second closest to the bearing space S. The seal lip member 61 is made of a rubber material and integrally fixed to the core metal 60 by vulcanization molding. The seal lip member 61 includes a seal lip base portion 610, and the first lip portion 611, the second lip portion 612, and the third lip portion 613 extending from the seal lip base portion 610.

The core metal 60 has a cylindrical portion 600 internally fitted to the inner diameter surface 2b on the vehicle body side of the outer ring 2, and an inward flange portion 601 extending radially inward from the end portion 600a of the cylindrical portion 600 on the bearing space S side. The slinger 50 includes a slinger cylindrical portion 500 externally fitted to the outer diameter surface 4b of the inner ring 5 (inner ring member 4), and an outward flange portion 501 extending radially outward from the end portion 500a of the slinger cylindrical portion 500 on the side opposite to the bearing space S. The core metal 60 and the slinger 50 are formed to have a substantially L-shaped cross-section by pressing a steel plate. The core metal 60 having the seal lip member 61 and the slinger 50 are assembled so as to face each other as illustrated in FIG. 2A to thereby constitute a so-called pack seal type bearing seal 10.

The first lip portion 611 is an axial lip, is formed in a shape which increases in diameter toward the front side, and comes into contact with the wheel side surface 501a of the outward flange portion 501 of the slinger 50 with elastic deformation. The second lip portion 612 and the third lip portion 613 are radial lips, are formed in a shape which decreases in diameter toward the front side, and comes into contact with the outer diameter surface 500b of the slinger cylindrical portion 500 of the slinger 50 with elastic deformation. The second lip portion 612 is formed so as to face the bearing space S side, and the third lip portion 613 is formed so as to face the side opposite to the bearing space S. Therefore, the second lip portion 612 may be referred to as a grease lip. The lip portions 611, 612, and 613 indicated by two-dot chain lines in FIG. 2A each illustrate the original shape before elastic deformation (the same applies hereinafter). The seal lip base portion 610 wraps around the inner peripheral edge portion 601b from a part of the surface 601a of the inward flange portion 601 on the bearing space S side in the core metal 60, covers the entire surface of the surface 601c on the side opposite to the bearing space S of the inward flange portion 601, and is integrally fixed to the core metal 60. Furthermore, the seal lip base portion 610 covers the entire inner diameter surface 600b of the cylindrical portion 600 of the core metal 60 and is integrally fixed to the core metal 60.

The through-holes 612a and 613a provided in the second lip portion 612 and the third lip portion 613 will be described in more detail. As described above, the through-holes 612a and 613a are formed so as to open to the front and rear surfaces of the second lip portion 612 and the third lip portion 613, respectively, that is, to penetrate in the thickness direction. In FIG. 3B, only the third lip portion 613 and the through-hole 613a appear in the drawing, but the second lip portion 612 and the through-hole 612a exist behind the third lip portion 613. Four through-holes 613a are provided at intervals of 90° in the circumferential direction. Similarly to the through-hole 613a, four through-holes 612a are provided at intervals of 90° in the circumferential direction. The through-hole 613a and the through-hole 612a are provided at the same phase in the circumferential direction. The through-holes 612a and 613a are provided near the base end sides of the second lip portion 612 and the third lip portion 613, respectively. The through-holes 612a and 613a are provided closer to the base ends of the second lip portion 612 and the third lip portion 613 than the tips of the second lip portion 612 and the third lip portion 613. The through-holes 612a and 613a of the second lip portion 612 and the third lip portion 613 are provided at positions separated from the outer diameter surface 500b of the slinger cylindrical portion 500. In the present embodiment, the through-holes 612a and 613a are provided so as to be separated from the outer diameter surface 500b by 0.1 mm or more in a state in which the second lip portion 612 and the third lip portion 613 are in contact with the outer diameter surface 500b of the slinger cylindrical portion 500 with elastic deformation. That is, as illustrated in FIG. 2B, in the contact state, the distance d1 and d2 between the opening edge portion closest to the outer diameter surface 500b of the opening portion of the through-hole 612a and 613a on the slinger cylindrical portion 500 side and the outer diameter surface 500b is set to 0.1 mm or more.

Grease g1 having a consistency of 350 or less is supplied to the space portion S1 formed by the second lip portion 612, the third lip portion 613, and the outer diameter surface 500b of the slinger cylindrical portion 500. In the present embodiment, the grease g1 is supplied so as to cover the entire opening portions of the through-holes 612a and 613a on the slinger cylindrical portion 500 side, but may be supplied so as to cover the opening portion on the side opposite to the slinger cylindrical portion 500. In addition, similar grease g2 is also supplied to the corner portion (triangular corner portion) S2 formed by the tip portion of the first lip portion 611 and the wheel side surface 501a of the outward flange portion 510 of the slinger 50. The consistency of the grease g1 supplied in this embodiment is preferably 270 to 320. In addition, as the yield stress of the grease g1, the stress at the shear rate of 0.2/s is preferably 300 Pa to 3,000 Pa. In FIG. 2B, the illustration of the grease g1 is omitted. Furthermore, the opening areas of the through-holes 612a and 613a are formed to have a size to allow gas to pass hindering the grease g1 from passing. The opening areas of the through-holes 612a and 613a are not particularly limited, but is preferably, for example, 4 mm$^2$ or less. In addition, the through-holes 612a and 613a are preferably formed to have a diameter of 0.3 mm to 2 mm, and more preferably, 0.5 mm to 1 mm.

The bearing seal 10 configured as described above is mounted on the vehicle body side end portion of the bearing space S in the bearing device 1 as illustrated in FIG. 1. As the drive shaft 7 rotates around the axis L, the inner ring 5 and the slinger 50 integrated with the inner ring 5 rotate around the axis L. During this rotation, the first lip portion 611 comes into relatively elastic sliding contact with the wheel side surface 501a of the outward flange portion 501 of the slinger 50. In addition, the second lip portion 612 and the third lip portion 613 come into relatively elastic sliding contact with the outer diameter surface 500b of the slinger cylindrical portion 500 of the slinger 50. Due to these elastic sliding contacts, muddy water or the like from the outside is suppressed from intruding into the bearing seal 10. In addition, the lubricant filled in the bearing space S is prevented from leaking to the outside. In the triangular corner portion S2 at the contact portion of the first lip portion 611 with respect to the outward flange portion 501, since the grease g2 is supplied, the grease g2 intrudes between the sliding contact portions with the rotation. Therefore, the first lip portion 611 comes into relatively sliding contact with the outward flange portion 501 of the slinger 50 with less resistance, the rotational torque of this portion is reduced, and the sealing performance of the sliding contact portion is improved. Furthermore, since the grease g1 is also supplied to the space portion S1 between the second and third lip portion 612 and 613 and the slinger 50, and the grease g1 intrudes between the sliding contact portions of the second and third lip portion 612 and 613 and the cylindrical portion 500 of the slinger 50 with the rotation. Therefore, the second lip portion 612 and the third lip portion 613 come into relatively sliding contact with the slinger 50 with less resistance, the rotational torque of this portion is reduced, and the sealing performance of the sliding contact portion is improved.

When the first lip portion 611, the second lip portion 612, and the third lip portion 613 come into elastic sliding contact with the slinger 50, friction energy is generated between the lip portions 611, 612, and 613 and the slinger 50. Therefore, air existing between the lip portions 611, 612, and 613 tends to expand. However, according to the bearing seal 10 of the present embodiment, the air is discharged to the outside of the space between the lip portions through the through-holes 612a and 613a. In addition, when the rotation of the inner ring 5 is stopped, the temperature decreases and, as the air is discharged, the pressure between the lip portions tends to become a negative pressure. However, in this case, since the air flows between the lip portions through the through-holes 612a and 613a, the negative pressure is eliminated. Therefore, it is possible to alleviate the internal pressure change occurring between the lip portions and reduce the rotational torque of the inner ring 5 with respect to the outer ring 2. Furthermore, since the through-hole is not formed in the first lip portion 611 provided at a position closest to the outside and is formed to block ventilation with the outside, it is possible to prevent foreign matter such as muddy water from intruding into the third lip portion 613 and the second lip portion 612. As compared with a structure in which the valve is formed in the lip portion, it is possible to easily realize the lip portion having the function of alleviating the internal pressure change between the lip portions.

In addition, in the present embodiment, since the consistency of the grease g1 supplied to the space portion between the second and third lip portions 612 and 613 and the slinger 50 is 350 or less, the grease g1 is in a semi-solid state in a state in which the rotation of the inner ring 5 is stopped, and thus the grease g1 functions to close the through-holes 612a and 613a. Therefore, it is possible to prevent muddy water or the like from intruding into the space portion through the through-holes 612a and 613a by the grease g1. On the other hand, when the grease g1 receives a shear force due to the negative pressure between the second lip portion 612 and the third lip portion 613, the rotation of the inner ring 5, or the like, the grease g1 tends to become liquefied and flow. The air between the second lip portion 612 and the third lip portion 613 smoothly flows through the through-holes 612a and 613a. Therefore, it is possible to improve the sealing performance without deteriorating the function of alleviating the internal pressure change between the second lip portion 612 and the third lip portion 613. In addition, when the consistency of the grease g1 exceeds 350, it becomes impossible to expect the function of closing the through-holes 612a and 613a provided in the second lip portion 612 and the third lip portion 613 by the grease g1 as described above.

Generally, it is known that the resistance force of the fluid such as the grease to pass through the through-hole is inversely proportional to the diameter of the through-hole. In the present embodiment, the opening areas of the through-holes 612a and 613a are formed to have a size to allow the air to pass hindering the grease g1 from passing. Therefore, together with the yield stress of the grease g1, as the through-holes 612a and 613a become smaller, the grease g1 has a large force required for passing as compared with the gas, and it is possible to prevent the grease g1 from moving to other spaces through the through-holes 612a and 613a.

Furthermore, in the present embodiment, the through-holes 612a and 613a are respectively provided in the second lip portion 612 provided at the position which is closest to the annular space S and the third lip portion 613 provided at the position which is second closest to the bearing space S. Therefore, when the internal pressure change occurs between the second lip portion 612 and the third lip portion 613, the bearing space S in which the volume larger than that between the second lip portion 612 and the third lip portion 613 exists can be used as a buffer, and thus it is possible to further improve the effect of alleviating the internal pressure change.

Furthermore, in the present embodiment, in the contact state with respect to the slinger 50 of the second lip portion 612 and the third lip portion 613, the distances d1 and d2 between the opening edge portions of the through-holes 612a and 613a and the outer diameter surface 500b are set to 0.1 mm or more. Therefore, even if the second lip portion 612 and the third lip portion 613 come into relatively sliding contact with the slinger 50 in an elastically deformed state, the openings of the through-holes 612a and 613a are not blocked by the slinger 50. Therefore, it is possible to prevent the functions of the through-holes 612a and 613a from being impaired. In addition, when the distances d1 and d2 are less than 0.1 mm, the openings of the through-holes 612a and 613a are easily blocked by the slinger 50 due to the elastic deformation of the second lip portion 612 and the third lip portion 613.

Figure 4:
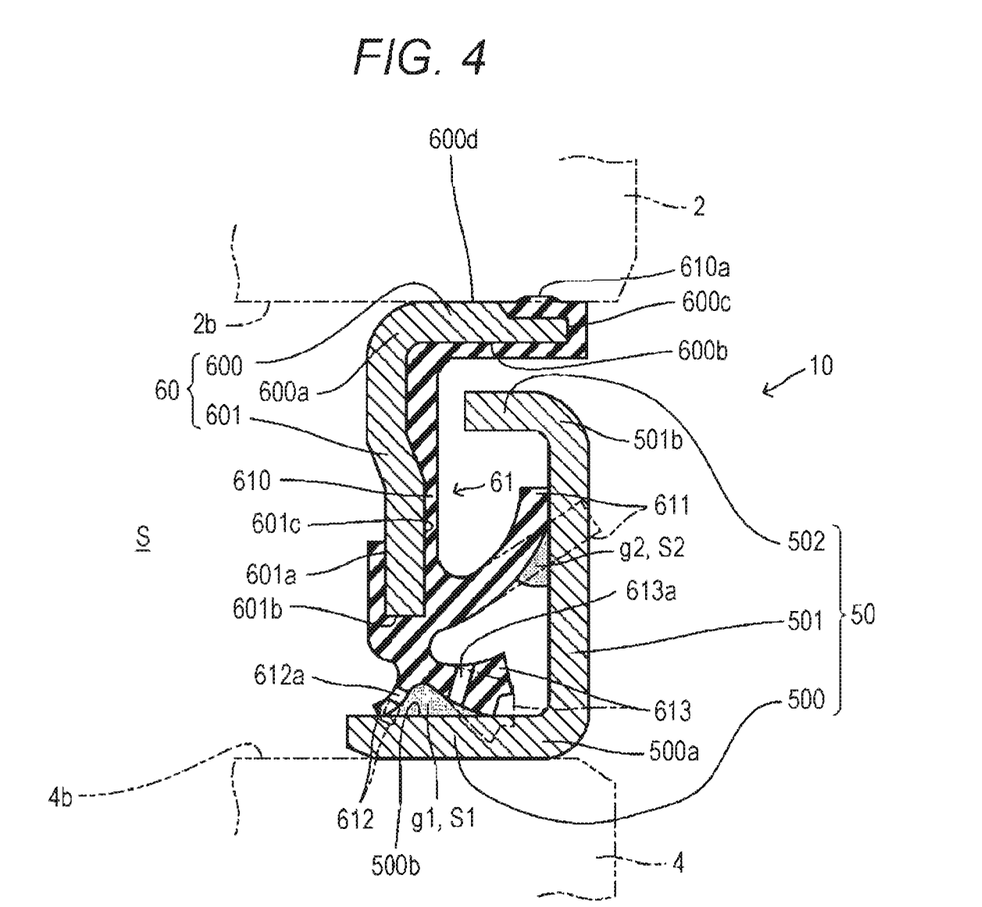
FIG. 4 is an enlarged view corresponding to a portion X in FIG. 1 illustrating a modification of the sealing device of the embodiment.

FIG. 4 illustrates a modification of the embodiment. In the bearing seal (sealing device) 10 of this example, the slinger 50 constituting a part of the inside member has a bent cylindrical portion 502 bent from the outer diameter side end portion 501b of the outward flange portion 501 toward the bearing space S side. In addition, the seal lip base portion 610 is integrally fixed to the core metal 60 so as to wrap around the vehicle body side end portion 600c from the inner diameter surface 600b of the cylindrical portion 600 of the core metal 60 and cover a part of the outer diameter surface 600d. Furthermore, an annular protrusion portion 610a is formed in a portion of the seal lip base portion 610 covering the outer diameter surface 600d of the cylindrical portion 600. Since the other configurations are the same as the examples illustrated in FIGS. 2A and 2B, the description thereof will be omitted hereinafter.

The bearing seal 10 of this example is also mounted on the vehicle body side end portion of the bearing space S in the bearing device 1 illustrated in FIG. 1. At this time, the annular protrusion portion 610a is interposed in a compressed state between the vehicle body side inner diameter surface 2b of the outer ring 2 and the outer diameter surface 600d of the cylindrical portion 600 of the core metal 60. Therefore, the core metal 60, the outer ring 2, and the metal fitting portion are sealed, rusting of the metal fitting portion is suppressed, and intrusion of muddy water or the like into the bearing space S from the metal fitting portion is suppressed. In addition, since the slinger 50 includes the bent cylindrical portion 502 facing the inside of the bearing seal 10, the path of the intrusion of muddy water or the like into the bearing seal 10 from the outside is elongated. Therefore, the arrival of muddy water or the like containing foreign matter to the sliding contact portion of the first lip portion 611, the third lip portion 613, and the second lip portion 612 with respect to the slinger 50 is delayed, and the life of the sealing property is prolonged.

Figure 5:
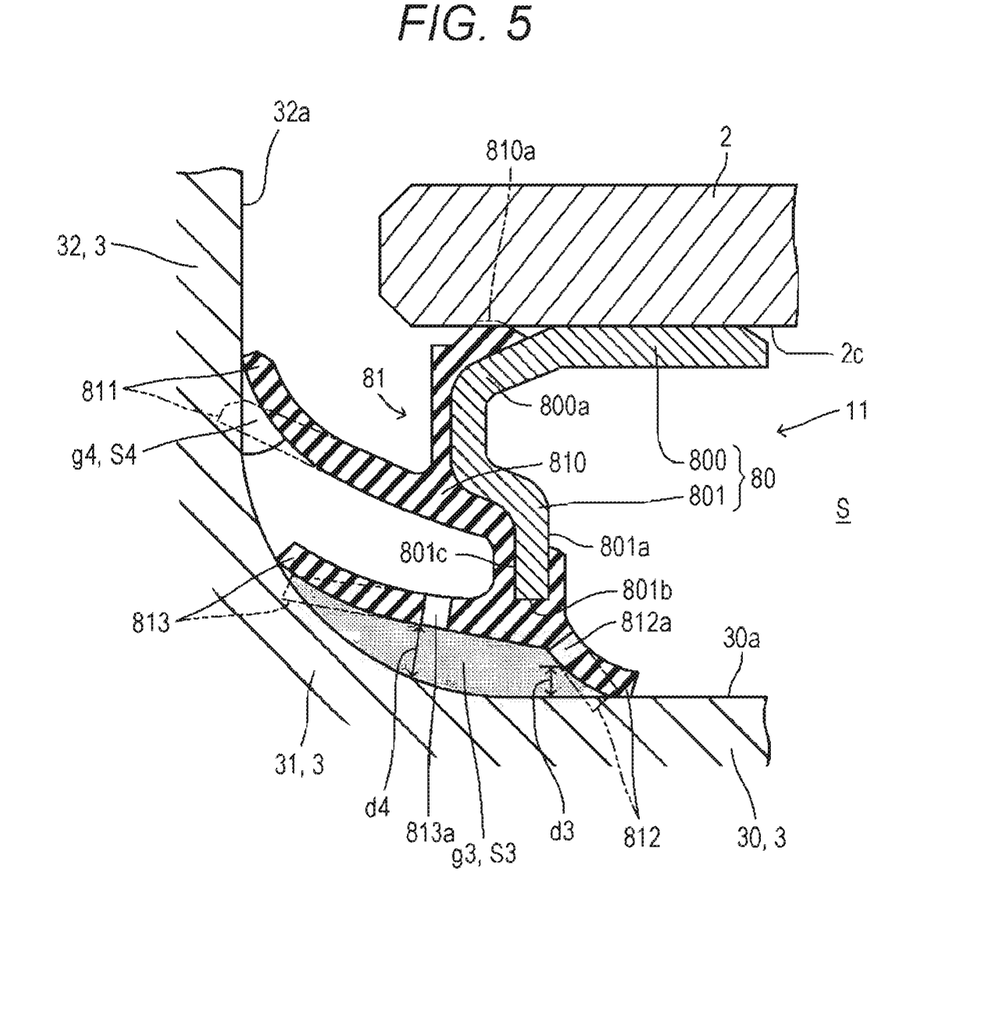
FIG. 5 is a view illustrating a second embodiment of the sealing device according to the present invention and is an enlarged view of a portion Y in FIG. 1.

FIG. 5 is a view illustrating a second embodiment of the sealing device according to the present invention and illustrates an example applied to the bearing seal 11 of the wheel side in FIG. 1. The bearing seal 11 of this example includes a core metal 80 having a cylindrical portion 800 to be fitted to an outer ring (outside member, one member) 2, and a seal lip member 81 fixed to the core metal 80 and having a plurality of lip portions contacting a hub wheel (inside member, the other member) 3. The core metal 80 has a cylindrical portion 800 internally fitted to the wheel side inner diameter surface 2c of the outer ring 2, and an inward flange portion 801 extending from the end portion 800a of the cylindrical portion 800 on the side opposite to the bearing space S side toward the inner diameter side.

The plurality of lip portions include a first lip portion 811 provided at a position closest to the outside and blocking ventilation between the outside and the lip portion, and second and third lip portions (the other lip portions) 812 and 813 provided at positions farther from the outside than the first lip portion 811. In the second and third lip portions 812 and 813, through-holes 812a and 813a which are open to the front and rear sides and permit ventilation are provided at positions spaced apart from the contact point with the hub wheel 3. In the present embodiment, the second lip portion 812 is provided at a position which is closest to the bearing space S, and the third lip portion 813 is provided at a position which is second closest to the bearing space S. Similarly to the above example, the seal lip member 81 is made of a rubber material and integrally fixed to the core metal 80 by vulcanization molding. The seal lip member 81 includes a seal lip base portion 810, and the first lip portion 811, the second lip portion 812, and the third lip portion 813 extending from the seal lip base portion 810.

The first lip portion 811 is an axial lip, is formed in a shape which increases in diameter toward the front side, and comes into contact with the flange surface 32a of the hub flange 32 of the hub wheel 3 with elastic deformation. The second lip portion 612 is a radial lip (grease lip), is formed in a shape in which the front side is directed to the side of the bearing space S and decreases in diameter toward the front side, and comes into contact with the outer diameter surface 30a of the hub wheel body 30 of the hub wheel 3 with elastic deformation. Furthermore, the third lip portion 613 is an axial lip, is formed in a shape which increases in diameter toward the front side, and comes into contact with the concave curved surface 31a of the rising base portion 31 of the hub wheel 3 with elastic deformation. The seal lip base portion 810 wraps around the inner peripheral edge portion 801b from a part of the surface 801a of the inward flange portion 801 on the bearing space S side in the core metal 80, covers the entire surface of the surface 801c on the side opposite to the bearing space S of the inward flange portion 801, and is integrally fixed to the core metal 80. Furthermore, the seal lip base portion 810 has an annular protrusion portion 810a on the outermost diameter side portion thereof, and when the core metal 80 is fitted to the outer ring 2, the annular protrusion portion 810a is configured to be interposed between the core metal 80 and the outer ring 2 in a compressed state. In FIG. 5, the shape of the annular protrusion portion 810a before compression deformation is indicated by a two-dot chain line.

In the contact state with respect to the hub wheel 3 of the second lip portion 812 and the third lip portion 813, the distances d3 and d4 between the opening edge portion of the through-holes 812a and 813a closest to the hub wheel 3 and the hub wheel 3 are set to 0.1 mm or more. The formation modes of the other through-holes 812a and 813a are the same as those in the above example. Grease g3 having a consistency of 350 or less is supplied to the space portion S3 formed by the second lip portion 812, the third lip portion 813, and the outer diameter surface 30a, and the concave curved surface 31a of the hub wheel 3. Furthermore, similar grease g4 is also supplied to the corner portion (triangular corner portion) S4 formed by the tip portion of the first lip portion 811 and the flange surface 32a. The properties or the like of the greases g3 and g4 are the same as those of the greases g1 and g2 in the above example.

The bearing seal 11 configured as described above is mounted on the wheel side end portion of the bearing space S in the bearing device 1 as illustrated in FIG. 1. As the drive shaft 7 rotates around the axis L, the inner ring 5 rotates around the axis L. During this rotation, the first lip portion 811 comes into relatively elastic sliding contact with the flange surface 32a of the hub flange 32 of the hub wheel 3. In addition, the second lip portion 812 comes into relatively elastic sliding contact with the outer diameter surface 30a of the hub wheel body 30. Furthermore, the third lip portion 813 comes into relatively elastic sliding contact with the concave curved surface 31a of the hub wheel 3. Due to these elastic sliding contacts, muddy water or the like from the outside is suppressed from intruding into the bearing seal 11. In addition, the lubricant filled in the bearing space S is prevented from leaking to the outside. In the triangular corner portion S4 at the contact portion of the first lip portion 811 with respect to the flange surface 32a, since the grease g4 is supplied, the first lip portion 811 slidably contacts the hub wheel 3 with less resistance, and the rotational torque of this portion is reduced. Furthermore, since the grease g3 is also supplied to the space portion S3 at the contact portion between the second and third lip portions 812 and 813 and the hub wheel 3, the second lip portion 812 and the third lip portion 813 come into sliding contact with the hub wheel 3 with less resistance, and the rotational torque of this portion is reduced. In addition, the annular protrusion portion 810a is interposed in a compressed state between the wheel side inner diameter surface 2c of the outer ring 2 and the cylindrical portion 800 of the core metal 80. Therefore, the core metal 80, the outer ring 2, and the metal fitting portion are sealed, rusting of the metal fitting portion is suppressed, and intrusion of muddy water or the like into the bearing space S from the metal fitting portion is suppressed.

Since the action and effect by the formation mode of the other through-holes 812a and 813a or the action and effect by the properties of the grease g3 are the same as those in the above example, the description thereof will be omitted hereinafter.

Figure 6:
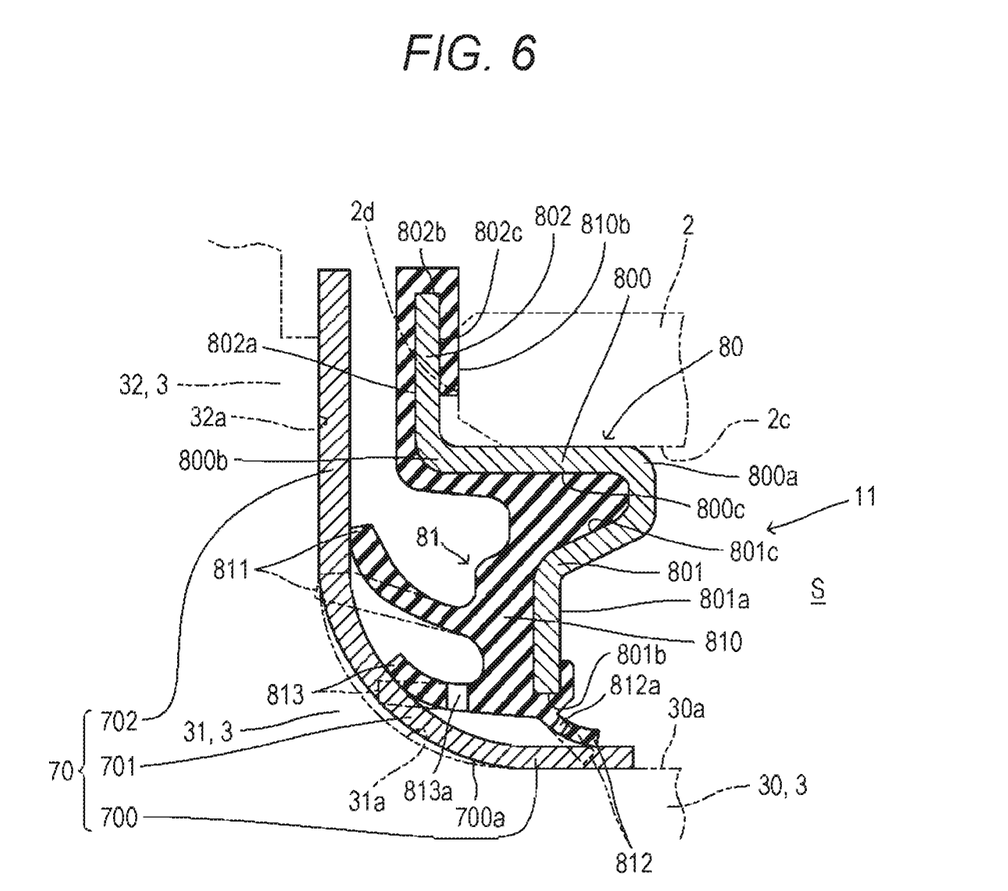
FIG. 6 is an enlarged view corresponding to a portion Y in FIG. 1 illustrating a modification of the sealing device of the embodiment.

FIG. 6 illustrates a modification of the second embodiment. In this example, the metal ring 70 mounted on the flange surface 32a from the outer diameter surface 30a of the hub wheel body 30 in the hub wheel 3 is provided as one component of the rotating side member (the other member). The metal ring 70 includes a cylindrical portion 700 externally fitted to the outer diameter surface 30a of the hub wheel body 30, and a circular plate portion 702 continuing from the one end portion 700a of the cylindrical portion 700 through the curved portion 701 to the outer diameter side. The circular plate portion 702 is configured to come into close contact with the flange surface 32a in a state in which the cylindrical portion 700 is fitted to the hub wheel body 30. The metal ring 70 is made of a metal material, such as stainless steel, which is hard to rust and has excellent lubricity. In addition, the core metal 80 has a cylindrical portion 800 internally fitted to the wheel side inner diameter surface 2*c* of the outer ring 2, an inward flange portion 801 extending from the end portion 800*a* of the cylindrical portion 800 on the bearing space S to the inner diameter side, and an outward flange portion 802 extending from the end portion 800*b* of the cylindrical portion 800 on the side opposite to the bearing space S to the outer diameter side.

The seal lip member 81 is made of a rubber as in the above example, and includes a seal lip base portion 810, and the first lip portion 811, the second lip portion 812, and the third lip portion 813 extending from the seal lip base portion 810. The seal lip base portion 810 wraps around the inner peripheral edge portion 801*b* from a part of the surface 801*a* of the inward flange portion 801 on the bearing space S side in the core metal 80, covers the entire surface of the surface 801*c* on the side opposite to the bearing space S of the inward flange portion 801, and is integrally fixed to the core metal 80. Furthermore, the seal lip base portion 810 is integrally fixed to the core metal 80 so as to cover the entire surface of the inner diameter surface 800*c* of the cylindrical portion 800 of the core metal 80, the entire surface of the surface 802*a* of the outward flange portion 802 opposite to the bearing space S, and a part of the surface 802*c* on the bearing space S side by wrapping around the outer peripheral portion 802*b* of the outward flange portion 802. The portion 810*b* which wraps around the surface 802*c* of the seal lip base portion 810 on the bearing space S side of the outward flange portion 802 is configured to come into close contact with the wheel side end surface 2*d* of the outer ring 2 when the core metal 80 is fitted to the outer ring 2. Therefore, intrusion of muddy water or the like into the metal fitting portion between the core metal 80 and the outer ring 2 is prevented.

In this example, the first lip portion 811 is configured to come into elastic contact with the circular plate portion 702 of the metal ring 70. In addition, the second lip portion 812 is configured to come into elastic contact with the curved portion 701 of the metal ring 70. Furthermore, the third lip portion 813 is configured to come into elastic contact with the cylindrical portion 700 of the metal ring 70. In addition, grease similar to that described above is supplied to the space portion formed by the second lip portion 812, the third lip portion 813, and the metal ring 70, and the corner portion (triangular corner portion) formed by the tip portion of the first lip portion 811 and the metal ring 70.

In this example, when the hub wheel 3 (inner ring 5) rotates, the first lip portion 811, the second lip portion 812, and the third lip portion 813 come into relatively elastic sliding contact with the metal ring 70. Since the metal ring 70 is made of a metal material having excellent lubricity, such as stainless steel, the metal ring 70 suppresses the tip portions of the first lip portion 811, the second lip portion 812, and the third lip portion 813 from be worn by sliding contact.

Since the other configurations are the same as those of the example illustrated in FIG. 5, the same reference numerals are assigned to the common components and the description thereof will be omitted.

In each of the above embodiments, the four through-holes 612*a* (812*a*) provided in the second lip portion 612 (812) and the four through-holes 613*a* (813*a*) provided in the third lip portion 613 (813) are provided, but the present invention is not limited thereto. One to three, or five or more through-holes may be provided. Furthermore, the positions of the through-holes 612*a* (812*a*) and 613*a* (813*a*) in the circumferential direction are not particularly limited, and in the case of the plurality of through-holes 612*a* (812*a*) and 613*a* (813*a*), they may be provided at irregular intervals in the circumferential direction. Furthermore, it is possible to provide the circumferential positions of the through-holes 612*a* (812*a*) and the through-holes 613*a* (813*a*) so as to be shifted in phase from each other.

In addition, although the opening areas of the through-hole 612*a* (812*a*) and the through-hole 613*a* (813*a*) may be the same, the opening area of the through-hole 612*a* (812*a*) may be larger than the opening area of the through-hole 613*a* (813*a*), or vice versa. The shapes of the through-holes 612*a* (812*a*) and 613*a* (813*a*) are not limited to the circular shape when viewed from the front, but may be a rectangular shape or a polygonal shape.

Furthermore, in each of the embodiments, the through-holes 612*a* (812*a*) and 613*a* (813*a*) are provided in the second lip portion 612 (812) and the third lip portion 613 (813), respectively, but may be provided only in one of them.

In addition, the properties of the greases g1 (g3) and g2 (g4) supplied to the respective parts are not particularly limited. However, the properties of the greases g1 (g3) and g2 (g4) may include the type of thickener, the type of base oil, kinematic viscosity at 40° C. of the base oil, and the like, and these may be suitably adopted according to required specifications. For example, when it is required to reduce the rotational torque generated by the sliding resistance between the second and third lip portions 612 (812) and 613 (813) and the inner ring 5, grease made of base oil having a kinematic viscosity of 10 mm$^2$/s to 30 mm$^2$/s at 40° C. may be used. In addition, the greases g1 (g3) and g2 (g4) supplied to both portions need not be the same in property.

Furthermore, the openings of the through-holes 612*a* (812*a*) and 613*a* (813*a*) are not necessarily covered with grease.

In addition, in each of the above embodiments, although the sealing device according to the present invention is applied to the bearing device for the automobile, the present invention is not limited thereto and is equally applicable to other industrial machinery devices as long as it has an inside member and an outside member which rotate relatively to each other. For example, the sealing device according to the present invention may be applied to the oil seal which is disposed between the housing and the rotational shaft and prevents oil leakage in the housing. In addition, in the bearing device illustrated in FIG. 1, the outer ring is the fixed side and the inner ring is the rotating side, but the bearing device may be a bearing device in which the outer ring is the rotating side and the inner ring is the fixed side. In addition, the shapes and configurations of the core metals 60 and 80 and the seal lip members 61 and 81 fixed thereto are not limited to those in the illustrated examples. In addition, the shapes, numbers, and the like of the lip portions 611 to 613 and 811 to 813 are not limited to those in the illustrated examples, and other embodiments can also be adopted. For example, the lip portion may be provided with the first lip portion and the second lip portion, and the third lip portion may not be provided. Furthermore, the shapes of the slinger 50 and the metal ring 70 are not limited to those in the illustrated examples. The shapes of the core metals 60 and 80 are not limited to those illustrated in the drawings, and other shapes can also be adopted. Furthermore, in the example of FIG. 2 or 4, an encoder (for example, a magnetic body in which magnetic poles N and S are alternately magnetized in a circumferential direction) for detecting rotation may be provided in the slinger 50.

What is claimed is:

1. A sealing device for sealing an annular space constituted by an inside member and an outside member which rotate relatively to each other, the sealing device comprising:
a core metal having a cylindrical portion fitted to one of the inside member and the outside member; and
a seal lip member fixed to the core metal and having a plurality of lip portions contacting the other of the inside member and the outside member,
wherein the plurality of lip portions comprises a first lip portion provided at a position closest to the outside and blocking ventilation between the outside and a space existing between the lip portions, and another lip portion provided at a position farther from the outside than the first lip portion,
the other lip portion is provided with a through-hole, which is open to front and rear surfaces to allow ventilation, at a position apart from a contact portion with the other member,
the other lip portion comprises a second lip portion provided at a position which is closest to the annular space, and a third lip portion provided at a position which is second closest to the annular space, and
the through-hole is provided in each of the second lip portion and the third lip portion.

2. The sealing device according to claim 1, wherein the through-hole is provided so as to be separated from the other member by 0.1 mm or more in a state in which the lip portion where the through-hole is provided comes into contact with the other member.

3. The sealing device according to claim 1, wherein grease is supplied to the other lip portion so as to cover at least one of openings on the front side or the rear side of the through-hole.

4. The sealing device according to claim 3, wherein the opening area of the through-hole is formed to have a size to allow air to pass hindering the grease from passing.

5. The sealing device according to claim 3, wherein the through-hole is provided so as to be separated from the other member by 0.1 mm or more in a state in which the lip portion where the through-hole is provided comes into contact with the other member.

* * * * *